April 1, 1924.
H. PEECE
EMERGENCY SPINDLE FOR VEHICLES
Filed Aug. 2, 1921
1,489,148
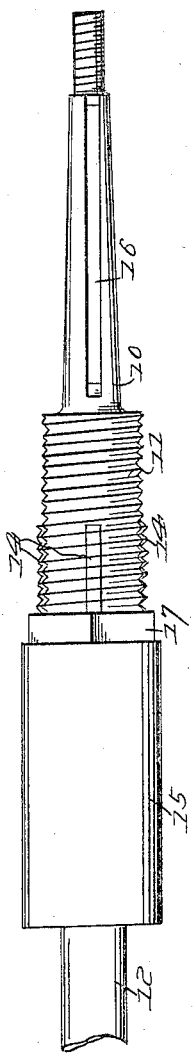
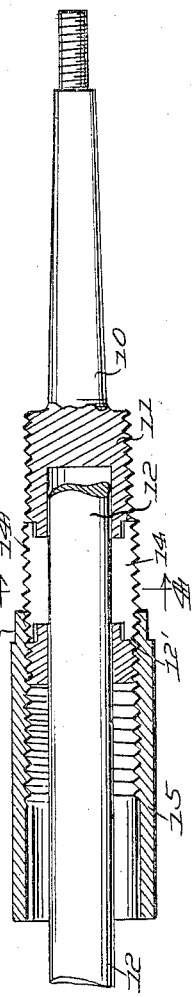
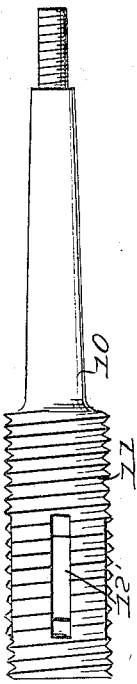
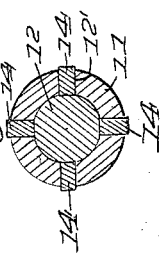
Inventor
Henry Peece,
By
Attorney Patented Apr. 1, 1924.

1,489,148

UNITED STATES PATENT OFFICE.

HENRY PEECE, OF WEST SALEM, OHIO.

EMERGENCY SPINDLE FOR VEHICLES.

Application filed August 2, 1921. Serial No. 489,168.

*To all whom it may concern:*

Be it known that HENRY PEECE, a citizen of the United States of America, residing at West Salem, in the county of Wayne and State of Ohio, has invented new and useful Improvements in Emergency Spindles for Vehicles, of which the following is a specification.

The object of the invention is to provide a simple and relatively inexpensive spindle for use in connection with automobiles and other vehicles in the event of the breakage of a wheel spindle, the construction of the same being such as to permit of its application to perform the function of the standard spindle under conditions which prevent access to a shop or garage, to the end that one or more devices for this purpose may be carried in the vehicle for use in an emergency or in the event of breakage on the road, to avoid the necessity of abandoning the vehicle or relying upon such assistance as can be obtained to move the vehicle to a shop where repair may be made; and with this object in view the invention consists in a construction and combination of parts of which a preferred embodiment is shown in the accompanying drawings, wherein:

Figure 1 is a side view of an emergency spindle applied in the operative position to a broken axle shaft.

Figure 2 is a sectional view of the same.

Figure 3 is a side view of the spindle member detached.

Figure 4 is a section on the line 4—4 of Figure 2.

The device consists essentially of a spindle portion 10 of conventional form having a socket member 11 for the reception of the end of the axle shaft 12 of the rear or driving axle of the car, said socket portion being provided with longitudinal slots 12' in which are arranged keys 14, and a sleeve 15 threaded upon the socket portion of the spindle in overlapping relation with the keys to force the latter inwardly into firm engaging contact with the surface of the axle shaft to lock the spindle in place and thereby permit of the normal use of the axle shaft in the further operation of the car.

The spindle portion 10 of the attachment is provided with the usual keyway 16 for locking the drive wheel thereto and the sleeve is provided with a wrench seat 17 to facilitate the adjustment thereof to properly clamp the emergency spindle to the end of the axle shaft. The keys at their inner edges are aligned with the inner surface of the wall of the socket portion of the spindle but are of such radial extent as to protrude slightly beyond the outer surface of said wall, being formed with threads to correspond with those on the exterior of the socket portion. The sleeve at the point of initial engagement with the keys is slightly enlarged interiorly to effect initial engagement with the keys so that, as the former is moved on the application of a wrench to the seat 17, the keys are forced radially inward to effect a biting engagement with the periphery of the broken axle.

In the event of a broken axle involving the displacement of the usual axle spindle it is only necessary to remove the broken spindle from the wheel and take the rollers out of the housing and substitute the emergency spindle, tightening the sleeve so as to clamp the socket portion of the said spindle to the end of the axle shaft whereupon the wheel may be replaced and the vehicle may proceed as before.

Having described the invention, what is claimed as new and useful is:—

An emergency spindle for power driven vehicles having a wheel spindle portion provided at its inner end with a socket for the reception of the end of a broken axle shaft, said socket portion being provided with longitudinal slots communicating with the bore thereof, keys movably fitted in said slots for engagement with the surface of the broken axle upon which the socket portion is fitted, the exterior of the socket portion and the outer edges of the keys being threaded and the keys being of a radial extent to protrude slightly beyond the outer periphery of the socket portion, and a sleeve interiorly threaded for engagement with the threads on the socket portion and the threads on the keys to force the latter into biting engagement with the axle shaft upon movement communicated to the sleeve by rotating the same, that end of the sleeve initially engaging the keys being slightly enlarged to effect such initial engagement.

In testimony whereof he affixes his signature.

HENRY PEECE.